United States Patent
Zakai et al.

[11] Patent Number: 5,738,132
[45] Date of Patent: Apr. 14, 1998

[54] ROLL OVER VENT VALVE

[75] Inventors: Avi Zakai, Rishon-LeZion; Asaf Halamish, Karkur, both of Israel

[73] Assignee: Raviv Precision Injection Molding, Israeli, co., Halutza, Israel

[21] Appl. No.: 591,360

[22] Filed: Jan. 25, 1996

[30] Foreign Application Priority Data

Jan. 25, 1995 [IL] Israel .................................. 112444

[51] Int. Cl.$^6$ .................................................. F16K 24/04
[52] U.S. Cl. .................................................. 137/43; 137/38
[58] Field of Search .................................. 137/38, 43

[56] References Cited

U.S. PATENT DOCUMENTS

| | | |
|---|---|---|
| 4,753,262 | 6/1988 | Bergsma. |
| 4,770,201 | 9/1988 | Zakai. |
| 4,886,089 | 12/1989 | Gabrlik .................. 137/202 |
| 5,027,844 | 7/1991 | Forsythe et al. ............ 137/43 |
| 5,313,977 | 5/1994 | Bergsma .................. 137/43 |
| 5,439,023 | 8/1995 | Horikawa ................ 137/43 X |

FOREIGN PATENT DOCUMENTS 26 47 648  12/1977  Germany.

*Primary Examiner*—Stephen M. Hepperle
*Attorney, Agent, or Firm*—Helfgott & Karas, PC.

[57] ABSTRACT

A roll over vent valve comprising:

a housing having a fluid inlet and a fluid outlet, the latter comprising a substantially elongated slit-like outlet aperture of the housing bounded by a valve seating. There is furthermore provided a float member located in the housing and axially displaceable within the housing between the inlet and the outlet; an elongated flexible closure membrane strip anchored at one end thereof to an end of the float member adjacent the outlet and at a portion thereof offset with respect to the outlet; spring biassing means located within the housing and bearing on the float member so as to spring bias it in the direction of the outlet; whereby the spring biassing together with buoyancy forces acting on the float member tend to press the membrane strip into sealing engagement with the outlet aperture whilst gravity forces acting on the float member tend to displace the float member away from the outlet so as to progressively detach the strip from sealing engagement with the outlet.

5 Claims, 4 Drawing Sheets 5,738,132

ROLL OVER VENT VALVE

FIELD OF THE INVENTION

This invention relates to a roll over vent valve designed to allow, on the one hand, for the venting of fuel vapor from a vehicle fuel tank to the atmosphere or to a vapor recovery system such as a carbon canister, and, on the other hand, to ensure the closure of the valve under certain conditions. These conditions can arise either when, as a result of excessive filling of the tank fuel, passes into the valve or, and most significantly, when as a result of a sudden change of position of the tank, such as, for example, when the vehicle and the tank roll over, fuel could escape from the tank through the otherwise opened valve.

BACKGROUND OF THE INVENTION

Such roll over vent valves are well known, examples thereof being described inter alia in U.S. Pat. Nos. 4,697,612 and 5,313,977.

A problem which arises with such known roll-over vent valves, especially those with a relatively large vent outlet aperture, is to ensure positive opening of the valve, either when the fuel level drops or when the vehicle and its fuel tank return to their normal position. Thus, the larger the vent outlet the greater the differential pressure acting on the valve and, in consequence, the greater the closing force effective on the valve. Whilst various solutions to this problem have been proposed such as, for example, in U.S. Pat. No. 5,313,977, namely the provision of mechanical means for ensuring the opening of the valve, these prior proposals tend to complicate the construction of the valve.

It is an object of the present invention to provide a new and improved roll over vent valve wherein the above-referred-to disadvantages are substantially reduced.

BRIEF SUMMARY OF THE INVENTION

According to the present invention, there is provided a roll over vent valve comprising a housing, a fluid inlet for said housing, a fluid outlet of said housing comprising a substantially elongated slit-like outlet aperture of said housing; a valve seating bounding said outlet aperture; a float member located in said housing and axially displaceable within said housing between said inlet and said outlet; an elongated flexible closure membrane strip anchored at one end thereof to an end of said float member adjacent said outlet and at a position thereof offset with respect to said outlet; spring biassing means located within said housing and bearing on said float member so as to bias it in the direction of said outlet, whereby said spring biassing together with buoyancy forces acting on said float member tend to press said membrane strip into sealing engagement with said outlet aperture whilst gravity forces acting on said float member tend to displace said float member away from said outlet so as progressively to detach said strip from sealing engagement with said outlet.

With such a roll over vent valve, the provision of an elongated, slit-like outlet aperture, together with a highly flexible elongated membrane strip, ensures that the opening forces effective on the valve are such as progressively to detach the strip from sealing engagement with the outlet. In this way it is ensured that the valve opens readily and effectively when required, without the necessity for the provision of additional, complicating mechanical means to this end.

Preferably, the housing and the float member are substantially coaxial, the valve seating being inclined with respect to a longitudinal axis of the housing and the float member. In accordance with this preferred embodiment, the valve seating can be substantially equally inclined with respect to the axis, whereby the membrane strip, when in sealing engagement with the valve seating, is pressed along its length against the valve seating by the inclined surface of the float member.

In accordance with a still further preferred embodiment of the present invention, the float member is partially hollow, having an internal, recessed portion which opens out into the portion of the float member adjacent the inlet and is sealed with respect to the portion of the float member adjacent the outlet. Thus, such a construction increases the effective buoyancy of the float member in response to the fluid level in the valve housing.

In accordance with a still further embodiment of the present invention, there are formed in the housing substantially adjacent to and downstream of the outlet aperture, a plurality of peripherally distributed through-flow apertures, having air deflecting baffles respectively associated therewith and formed integrally with an outside wall of the housing. In this way, air flow through the through-flow apertures is deflected. This can be of considerable importance, seeing that, with the valve mounted in the fuel tank with the outlet aperture thereof disposed outside the tank and when this outlet aperture is open, air flow from the tank through the through-flow apertures could tend to entrain fuel and thereby direct it out of the outlet aperture. In order to prevent this, the baffles are provided so as to divert the flow of air through the through-flow apertures.

BRIEF SUMMARY OF THE DRAWINGS

For a better understanding of the present invention and the way it is to be put into practice, reference will now be made to the accompanying drawings, which show, by way of example, a roll over vent valve in accordance with the invention, and in which.

DETAILED DESCRIPTION OF PREFERRED EMBODIMENTS

Figure 1:
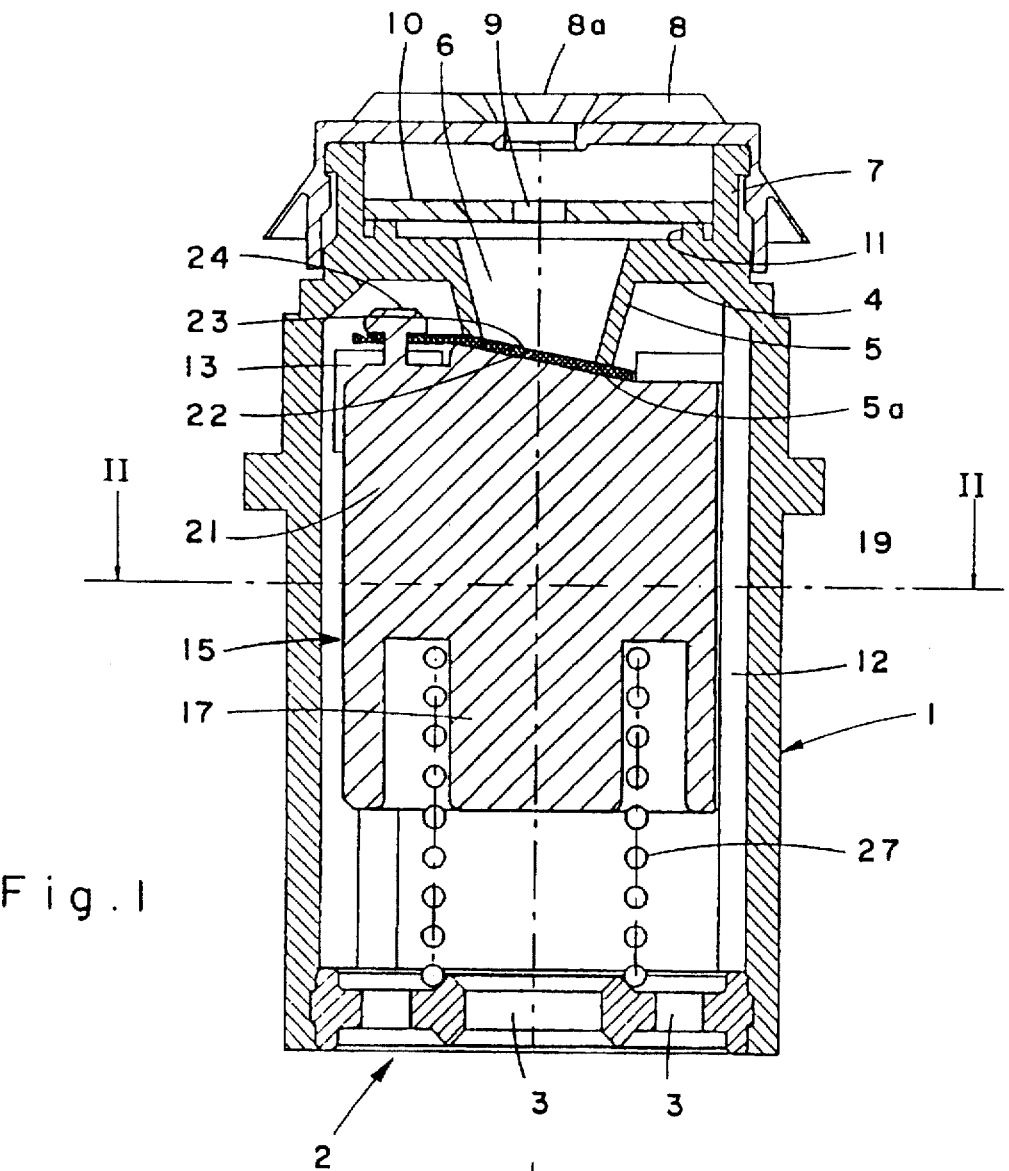
FIG. 1 is a longitudinally-sectioned view of a roll over vent valve in accordance with the present invention, shown in a closed position.

As seen in the drawings, the roll over vent valve comprises an outer, cylindrical housing 1 having fitted into an open lower end thereof an annular base member 2 in which are formed central and peripheral fluid inlets 3.

An upper end of the housing 1 is formed with an inwardly flanged closure member 4 having a downwardly depending outlet funnel 5 having at its lowermost end an inclined, elongated rim 5a which defines an inclined, elongated slit-like outlet 6. The rim 5a constitutes a valve seating. The upper end of the housing 1 is also formed with an upwardly extending annular skirt 7 on which is fitted a valve closure 8 having a centrally disposed valve outlet 8a. The outlet 8a is aligned with a corresponding outlet 9 formed in a disc-like closure member 10 supported on a peripheral rib 11 extending upwardly from the flanged closure member 4.

Peripherally disposed around the inner wall of the housing 1 are a plurality of longitudinally extending aligning ribs 12.

Formed in the housing walls substantially adjacent the outlet slit -like 6 are a plurality of through-flow apertures 13.

Figure 2:
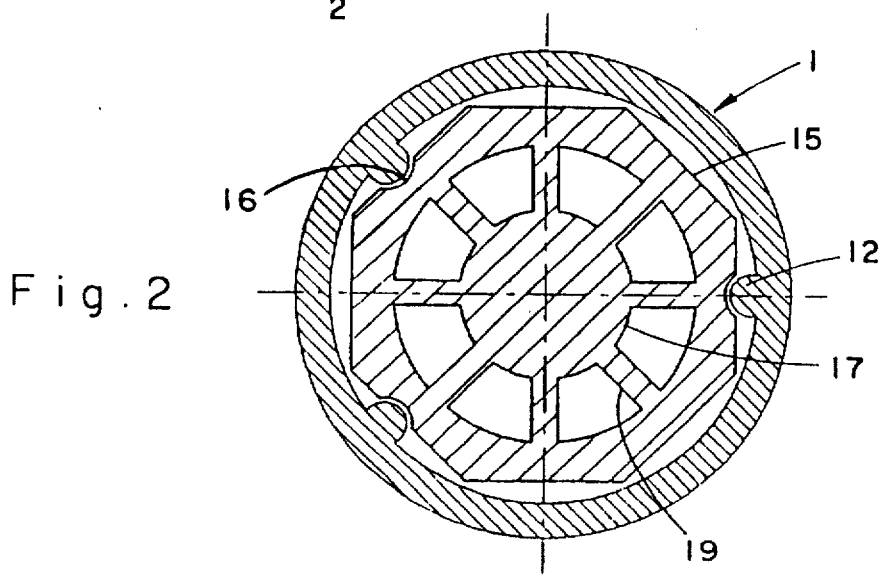
FIG. 2 is a cross-sectional view of the valve shown in FIG. 1, taken along the lines II:II.

Located coaxially within the housing 1 is a hollow float member 15 of substantially hexagonal cross-sectional shape. As seen in FIG. 2 of the drawings, there are formed in the outer walls of the float member 15 longitudinally directed recesses 16 in which respectively mate the longitudinal ribs 12, thereby ensuring the axial alignment of the float member 15 within housing 1. The float member 15 includes a central axial core member 17 which is integrally coupled at its upper section with the outer walls of the float member 15 by means of radially directed struts 19. The lower end of the first member 15 is formed with an annular, cylindrical recess 20. The lower end of the float member 15 is therefore effectively open, whilst the upper end thereof is sealed by means of an integrally-formed upper end wall 21. Formed centrally along an upper surface of the end wall 21 is an inclined bearing surface 22, whose inclination with respect to a longitudinal axis of the housing 1 and the float member 15 corresponds to the inclination of the valve seating 5a.

An elongated, strip-like, flexible membrane 23 is anchored at one extremity thereof via an anchoring stud 24 to the upper wall of the float member 15 which is offset with respect to the longitudinal axis of the housing 1 and with respect to the outlet 6.

A coiled compression spring 27 extends at its upper end into the annular recess 20 so as to surround the core 17, bearing at its upper end on the lower regions of the radial struts 19 and bearing at its lower end on the annular base 2.

As can be clearly seen from the drawings, the float member 15 is biassed upwardly by means of the compression spring 27, which acts together with the inherent buoyancy of the hollow float member 15, the buoyancy forces depending on the fuel level within the housing. These upwardly-directed forces (buoyancy and spring biassing) tend to seal the slit-like outlet aperture 6 by means of the strip-like membrane 23 which, as can be clearly seen in FIG. 1 of the drawings, is pressed against the inclined valve seating 5a by the correspondingly-inclined surface 22 of the upper wall 21 of the float member 15.

Figure 3:
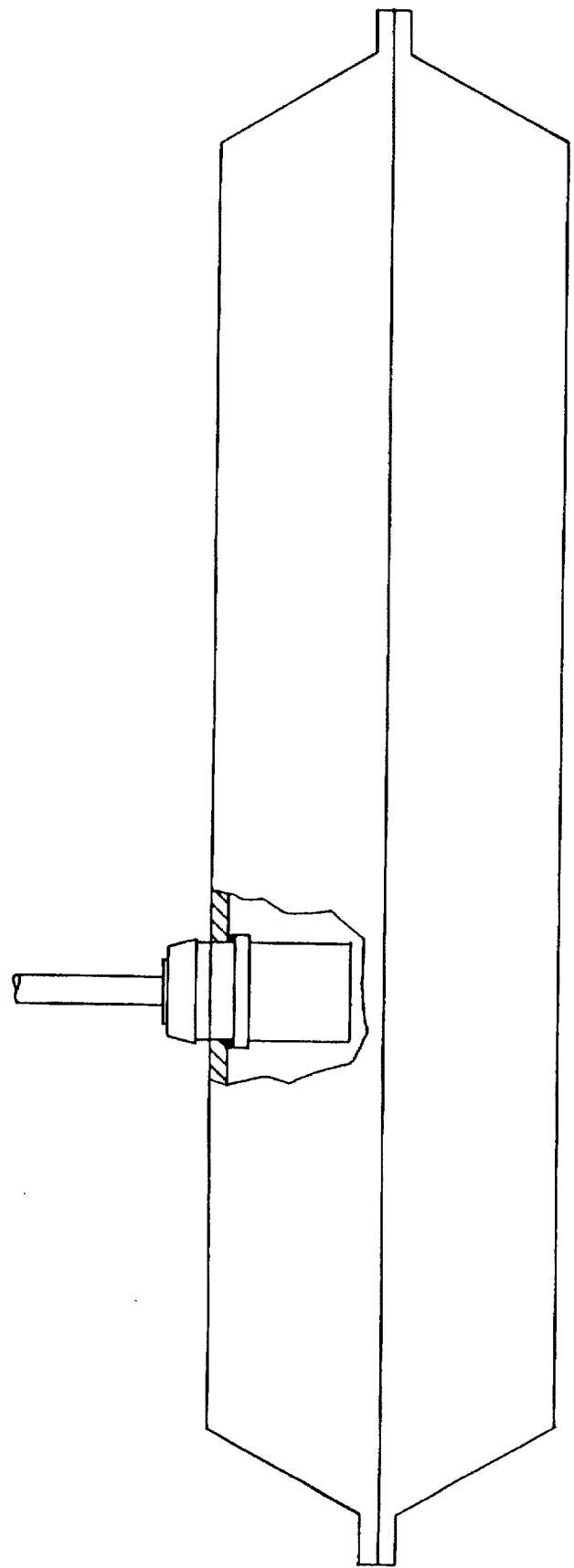
FIG. 3 is a schematic view of the valve shown in FIG. 5, when located within a fuel tank.

As shown schematically in FIG. 3 of the drawings, when the venting valve is mounted in a fuel tank, with the main body of the valve located within the tank, the outlet aperture thereof is exposed for connection either to the atmosphere or to an appropriate carbon canister (not shown).

Figure 4:
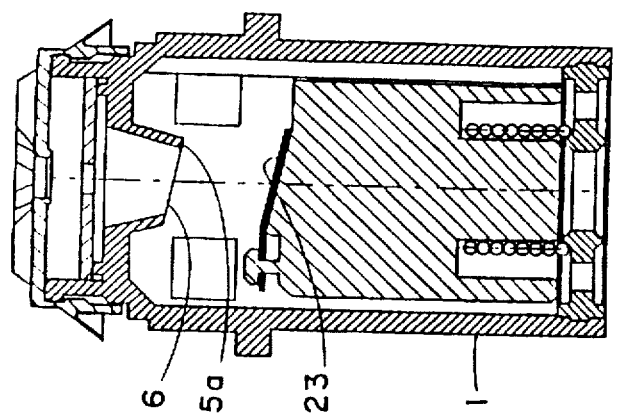
FIGS. 4, 5 and 6 are respective longitudinally-sectioned views of the valve shown in FIG. 1 in successive positions illustrating progressive closing of the valve.

In the normal condition of the valve, when it is mounted within the fuel tank, and the latter, together with the associated vehicle, is in an upright position, the valve is as shown in FIG. 4 of the drawings and no fuel should be present in the valve and maximum gravity forces are effected on the float member 15. In consequence, the weight of the float member, together with the absence of upwardly-directed buoyancy forces, overcome the upwardly-directed biassing effect of the compression spring 27 and the float member 15 is located in the position shown in FIG. 4 of the drawings with the outlet 6 completely open, thereby allowing for the venting of fuel vapors and the like.

Figure 5:
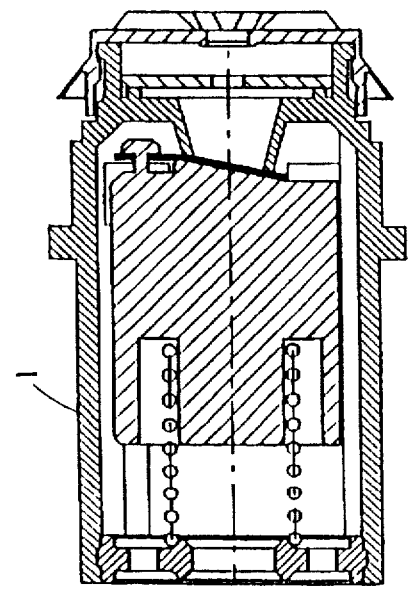
Figure 7:
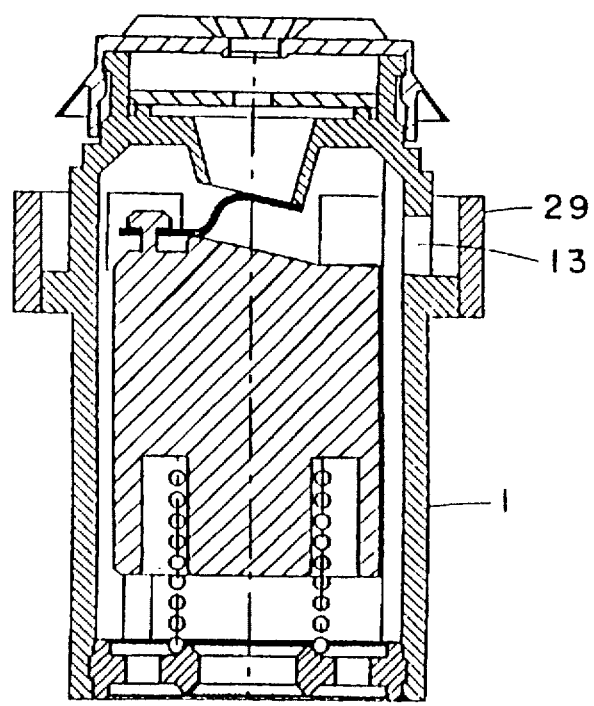
FIG. 7 is a longitudinally-sectioned view of a modified form of valve in accordance with the present invention.

When, however, either as a result of over-filling of the fuel tank and consequent entry of fuel into the valve, thereby increasing the upwardly-directed buoyancy forces acting on the float member 15, or as a consequence of a partial roll over of the vehicle and the fuel tank, resulting both in the entry into the housing of fuel and the reduction of the downwardly-directed gravity forces, the upwardly directed biassing effect of the compression spring 27, together possibly with the increased buoyancy, results in the upwardly-directed displacement of the float member 15 into the closed position as shown in FIGS. 1 and 5 of the drawings.

In this way, it is ensured that upon roll over or excessive fuel flow into the valve housing, the vent is closed against the escape of fuel.

Figure 6:
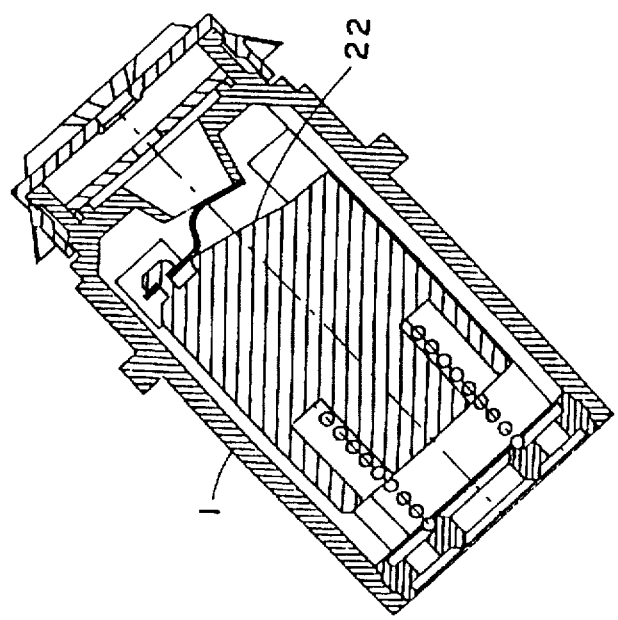

This situation, insofar as it relates to the roll over of the tank, is clearly illustrated in FIGS. 4, 5 and 6 of the drawings. Thus, as explained above, when the tank is in the upright position, as shown in FIG. 4 of the drawings, the valve is completely open. When, however, a roll over situation develops such as shown in FIG. 5 of the drawings, the valve is effectively in a substantially horizontal position and the gravity forces acting on the float member 15 are effectively overcome by the effect of the compression spring 27 (together with increased buoyancy forces resulting from inflow of fuel into the valve housing 1). The float member 15 is therefore displaced towards the outlet 6 which is effectively sealed by the membrane 23.

When, however, the fuel tank return to its normal position and/or fuel returns into the tank from the valve housing, the steadily increasing effect of gravity on the float member 15 overcomes the steadily decreasing upwardly-directed buoyancy forces and the biassing effect of the spring 27 and the float member 15 tends to move downwardly with the progressive detachment of the membrane 23 from the valve seating 5a, thereby resulting in the progressive opening of the venting outlet as clearly seen in FIG. 6 of the drawings.

It will be realized that, seeing that the opening of the venting outlet is a progressive process, ready and effective opening of the outlet can be effected without the use of external mechanical means.

With the venting valve open, the normal filling of the fuel tank results in an air flow from the tank, through the through-flow venting apertures 13 and out on the valve housing. In order to ensure that this air flow does not entrain fuel which can then escape from the valve, there is provided, as shown in FIG. 5 of the drawings, baffle walls 29 which surround the through-flow apertures 13 and effectively divert the air flow, thereby ensuring that only a minimal amount, if any, of fuel is entrained with the through-flowing air.

We claim:

1. A roll over vent valve comprising:
a housing, a fluid inlet for said housing, a fluid outlet of said housing comprising a substantially elongated slit-like outlet aperture of said housing; a valve seating bounding said outlet aperture; a float member located in said housing and axially displaceable within said housing between said inlet and said outlet; an elongated flexible closure membrane strip anchored at one end thereof to an end of said float member adjacent said outlet and at a portion thereof offset with respect to said outlet; spring biassing means located within said housing and bearing on said float member so as to bias it in the direction of said outlet; whereby said spring biassing together with buoyancy forces acting on said float member tend to press said membrane strip into sealing engagement with said outlet aperture whilst gravity forces acting on said float member tend to displace said float member away from said outlet so as to progressively detach said strip from sealing engagement with said outlet.

2. A roll over vent valve according to claim 1, wherein said housing and said float member are substantially coaxial and wherein said valve seating is inclined with respect to a longitudinal axis of said housing and float member.

3. A roll over vent valve according to claim 2, wherein a surface of said float member adjacent said valve seating is substantially equally inclined with respect to said axis whereby said membrane strip, when in sealing engagement with said valve seating, is pressed along its length against said valve seating by said inclined surface of said float member.

4. A roll over vent valve according to claim 1, wherein said float member is partially hollow, having an internal recessed portion which opens out into the portion of the float member adjacent said inlet and is sealed with respect to the portion of the float member adjacent said outlet.

5. A roll over vent valve according to claim 1, wherein there are formed in said housing substantially adjacent to and downstream of said outlet aperture, a plurality of peripherally distributed through-flow apertures and air deflecting baffles respectively associated with said through-flow apertures and formed integrally with an outside wall of said housing so as to deflect air flow through said through-flow apertures.

* * * * *